(12) United States Patent
Roh

(10) Patent No.: US 7,703,251 B2
(45) Date of Patent: Apr. 27, 2010

(54) SOLID PANEL FOR DECORATION

(76) Inventor: Won Hoon Roh, 180-13 Buk-Ri, Namsa-Myeon, Yongin-Si, Gyeonggi-Do (KR) 449-884

( * ) Notice: Subject to any disclaimer, the term of this patent is extended or adjusted under 35 U.S.C. 154(b) by 92 days.

(21) Appl. No.: 12/063,638

(22) PCT Filed: Aug. 10, 2006

(86) PCT No.: PCT/KR2006/003129

§ 371 (c)(1),
(2), (4) Date: Feb. 12, 2008

(87) PCT Pub. No.: WO2007/021092

PCT Pub. Date: Feb. 22, 2007

(65) Prior Publication Data

US 2008/0190061 A1 Aug. 14, 2008

(30) Foreign Application Priority Data

Aug. 12, 2005 (KR) ...................... 10-2005-0074039

(51) Int. Cl.
*E04C 1/00* (2006.01)
(52) U.S. Cl. .................... 52/309.9; 52/309.8; 52/311.1; 428/59; 428/304.4
(58) Field of Classification Search ............. 52/302.1, 52/309.11, 309.8, 309.9, 311.1, 311.2, 314, 52/384, 385, 390, 553, 762, 764, 772, 794.1; 428/304.4, 308.4, 318.4, 319.1, 319.3, 319.7
See application file for complete search history.

(56) References Cited

U.S. PATENT DOCUMENTS

| | | | | |
|---|---|---|---|---|
| 3,000,144 A | * | 9/1961 | Kitson | ..................... 52/309.11 |
| 4,254,178 A | * | 3/1981 | Church et al. | ............... 428/158 |
| 4,865,894 A | * | 9/1989 | Shubow | ........................ 428/59 |
| 4,948,655 A | * | 8/1990 | Danese | ....................... 428/213 |
| 5,280,689 A | * | 1/1994 | Mill | .......................... 52/309.9 |
| 5,540,022 A | * | 7/1996 | Morris | ....................... 52/309.8 |
| 5,725,940 A | * | 3/1998 | Sakai et al. | .............. 428/318.6 |
| 5,758,463 A | | 6/1998 | Mancini | |
| 5,916,102 A | * | 6/1999 | Peyton | ......................... 52/385 |
| 6,025,064 A | * | 2/2000 | Kawata et al. | ........... 428/304.4 |
| 6,308,491 B1 | * | 10/2001 | Porter | ....................... 52/794.1 |

(Continued)

FOREIGN PATENT DOCUMENTS

JP 08-209825 8/1996

(Continued)

*Primary Examiner*—David Dunn
*Assistant Examiner*—Benjamin Pevarski
(74) *Attorney, Agent, or Firm*—IPLA P.A.; James E. Bame

(57) ABSTRACT

A 3-dimensional decorative panel is disclosed to easily embody a wanted 3-dimensional shape by using Styrofoam having good heat insulation and workability. The panel includes a drain groove (22) formed on a side of the Styrofoam (20) for draining a rainwater, and a metal plate (10) coupled to a rear surface of the Styrofoam (20), the metal plate having a plurality of bent portions (11), and a reinforcing core (12) being attached to the metal plate 10. A polygarde (30), silicon (31), a polygarde (30), a primer (32), and a colored layer (33) are sequentially layered on a surface of the Styrofoam (20) in order to enhance a durability of the Styrofoam (20).

2 Claims, 7 Drawing Sheets

U.S. PATENT DOCUMENTS

| | | | |
|---|---|---|---|
| 6,319,590 B1 * | 11/2001 | Geddes et al. | 428/159 |
| 2003/0154676 A1 * | 8/2003 | Schwartz | 52/391 |
| 2004/0065035 A1 * | 4/2004 | De Vlam | 52/384 |
| 2004/0221530 A1 * | 11/2004 | Winberry | 52/311.1 |

FOREIGN PATENT DOCUMENTS

| | | |
|---|---|---|
| JP | 10-237983 | 9/1998 |
| JP | 2000-220233 | 8/2000 |
| JP | 2001-342705 | 12/2001 |

* cited by examiner

[Fig. 1]
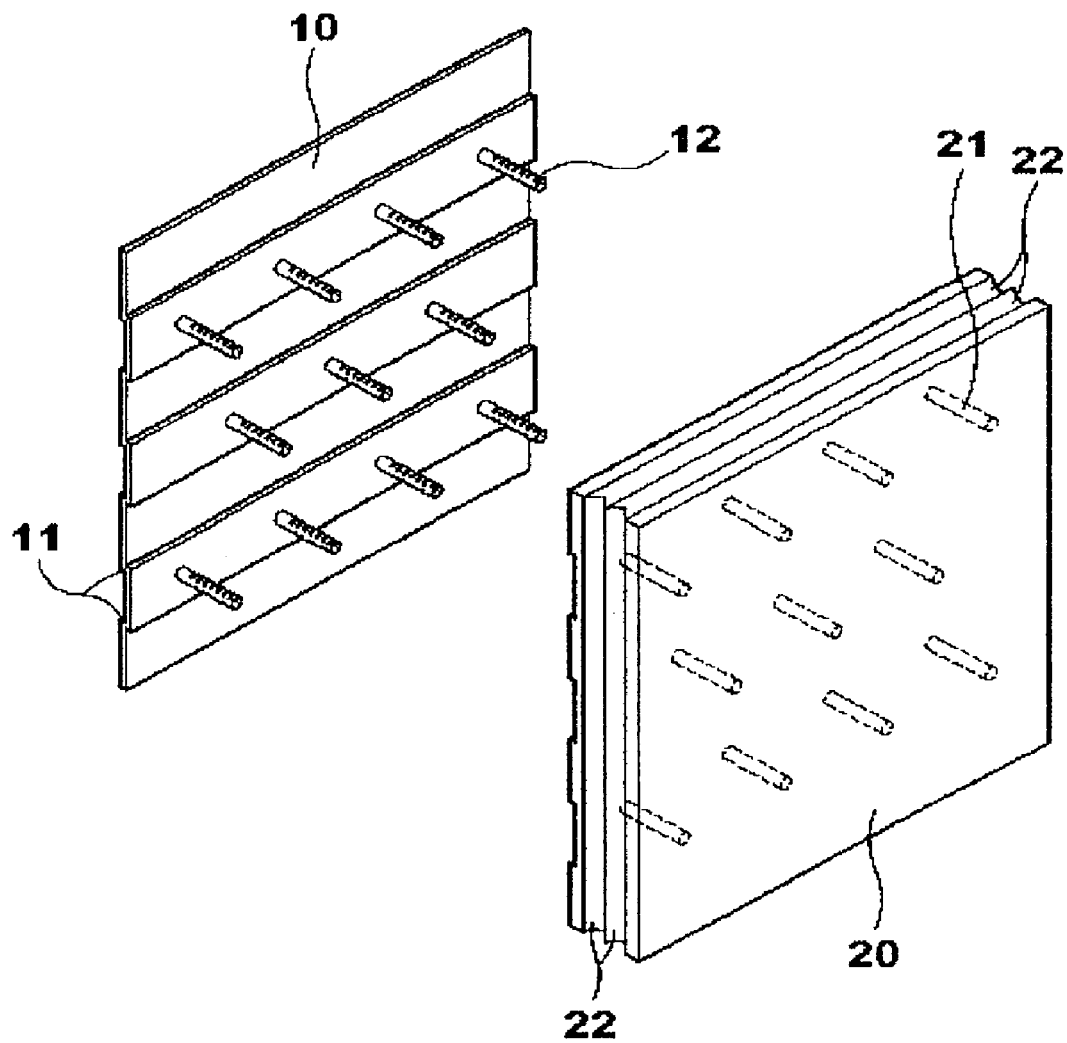

[Fig. 2]
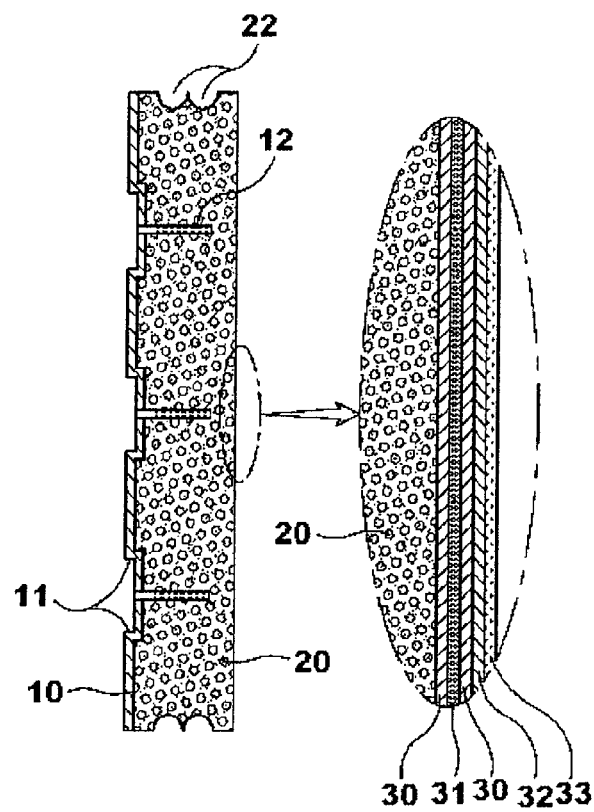
[Fig. 3]
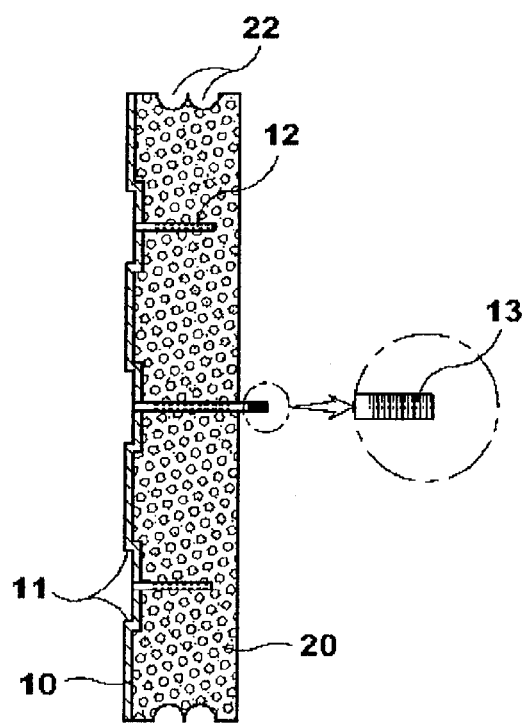

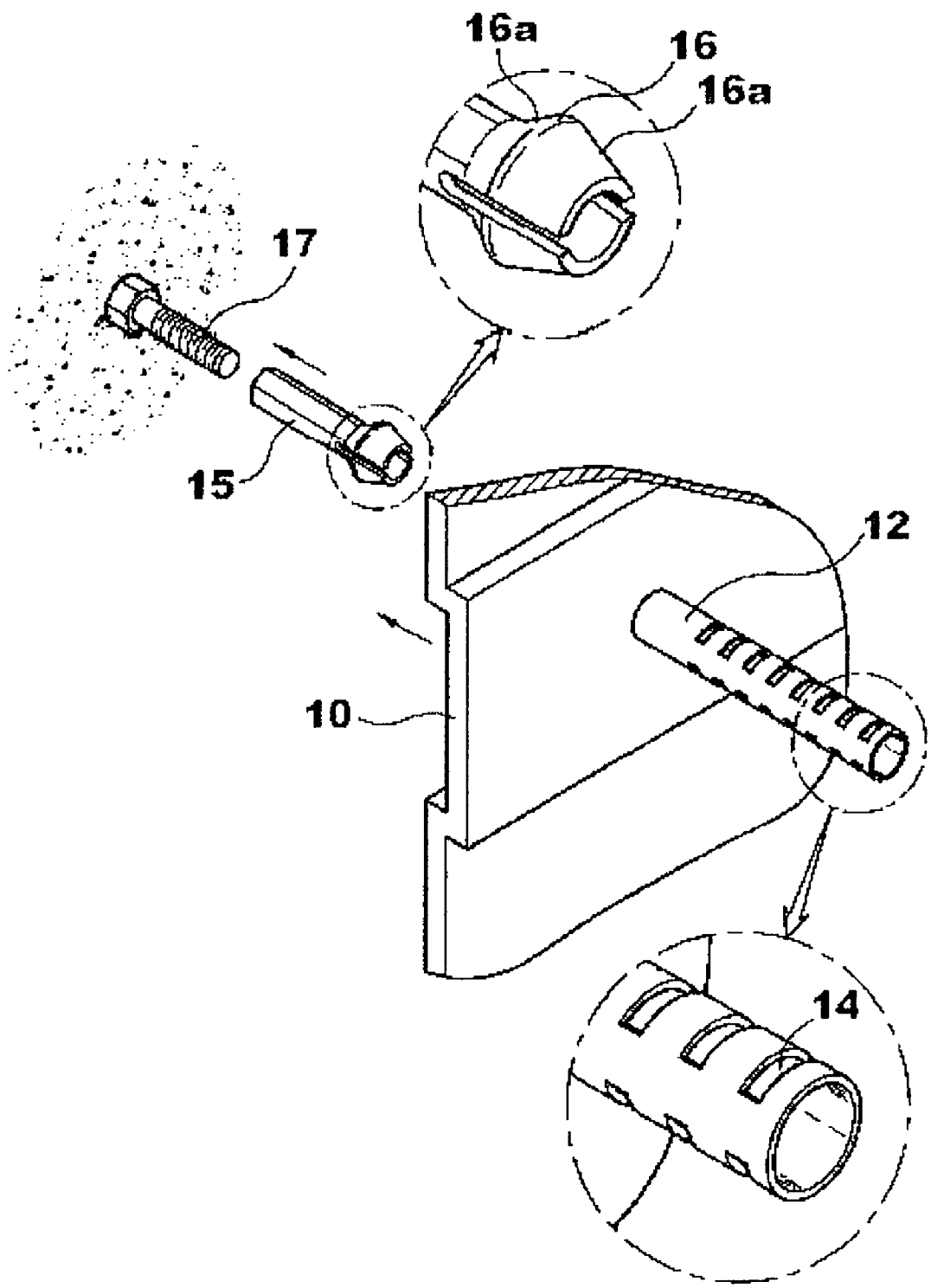
[Fig. 4]

[Fig. 5]
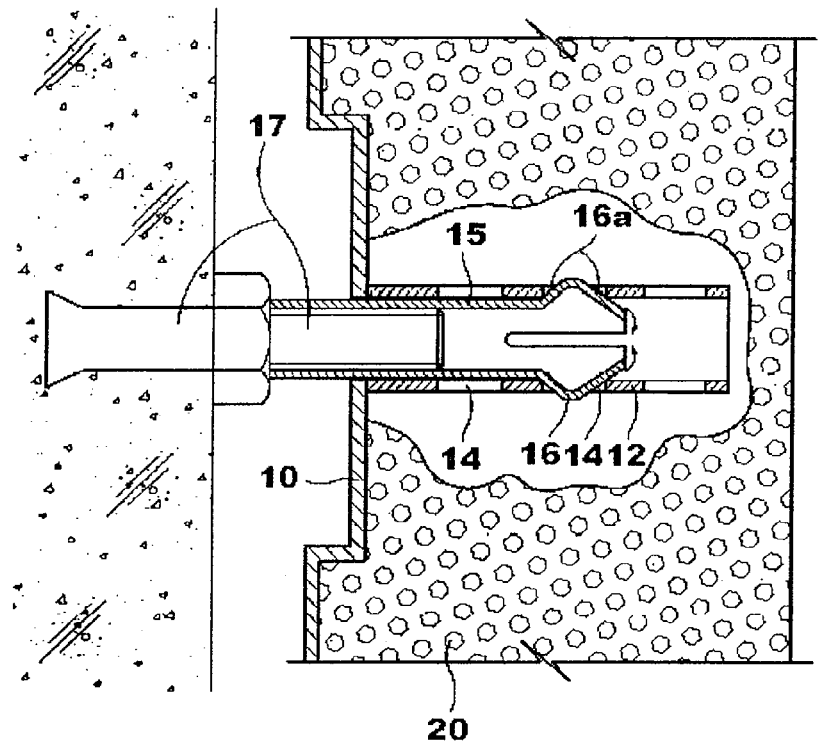
[Fig. 6]
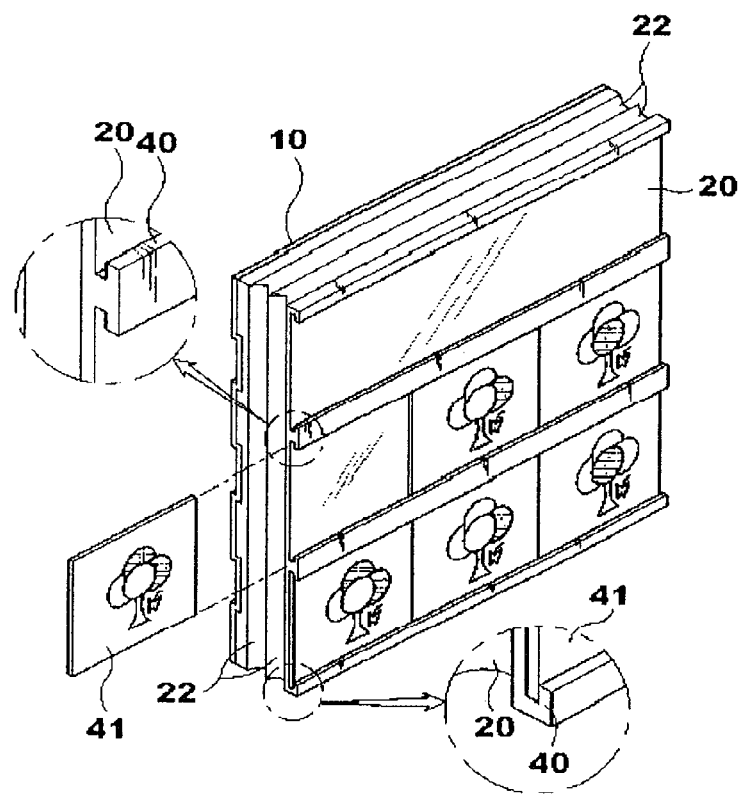

[Fig. 7]
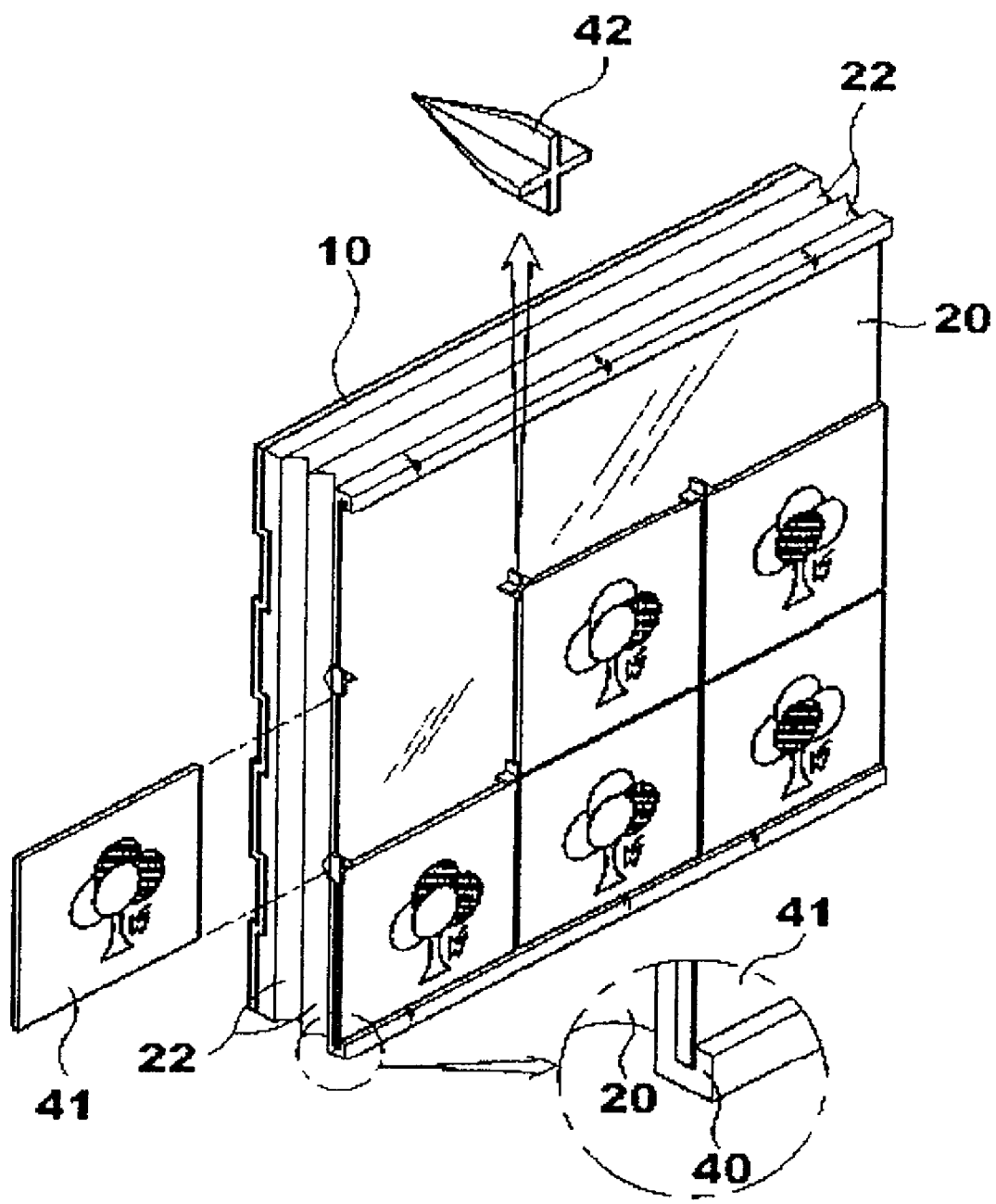

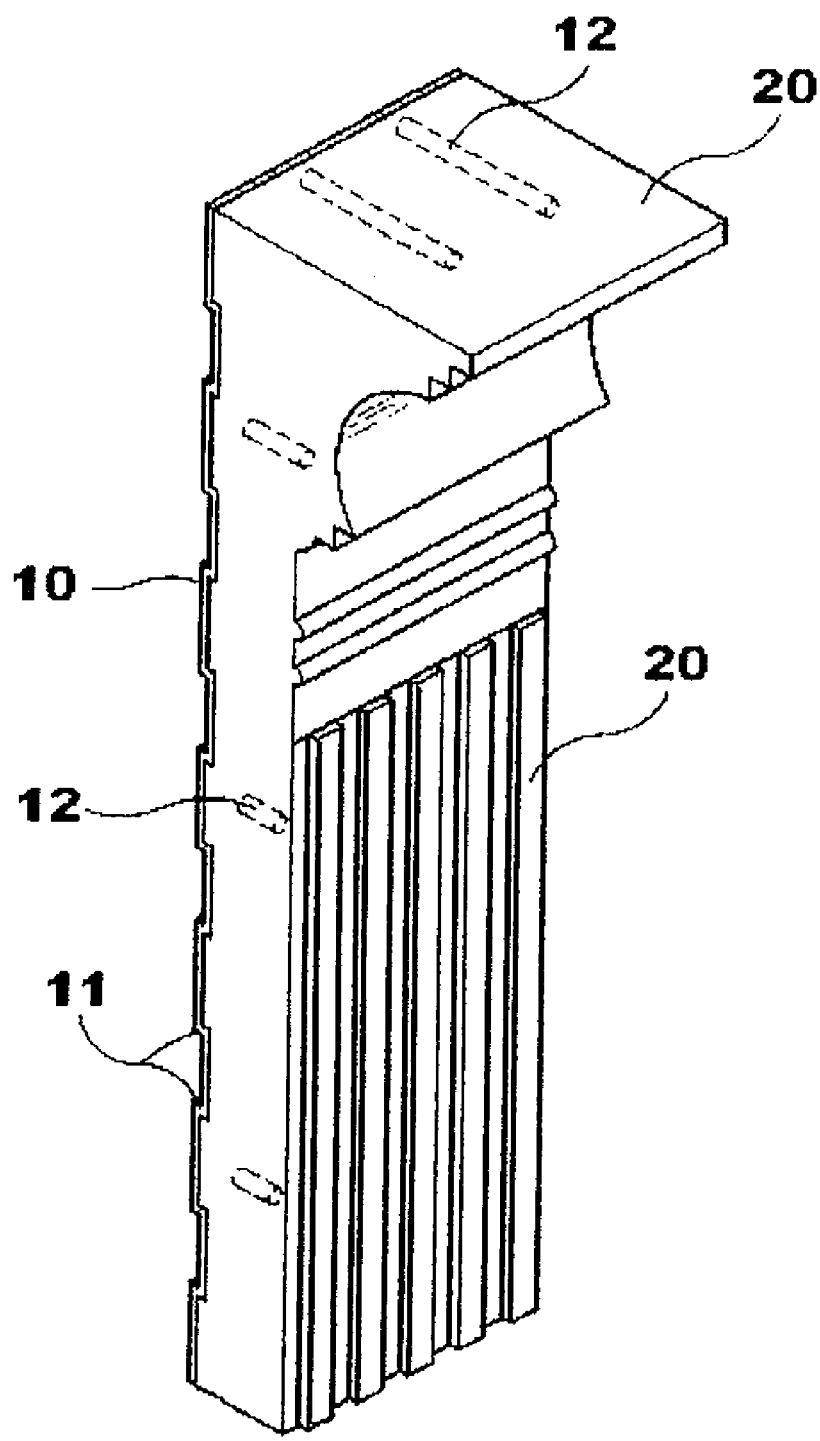
[Fig. 8]

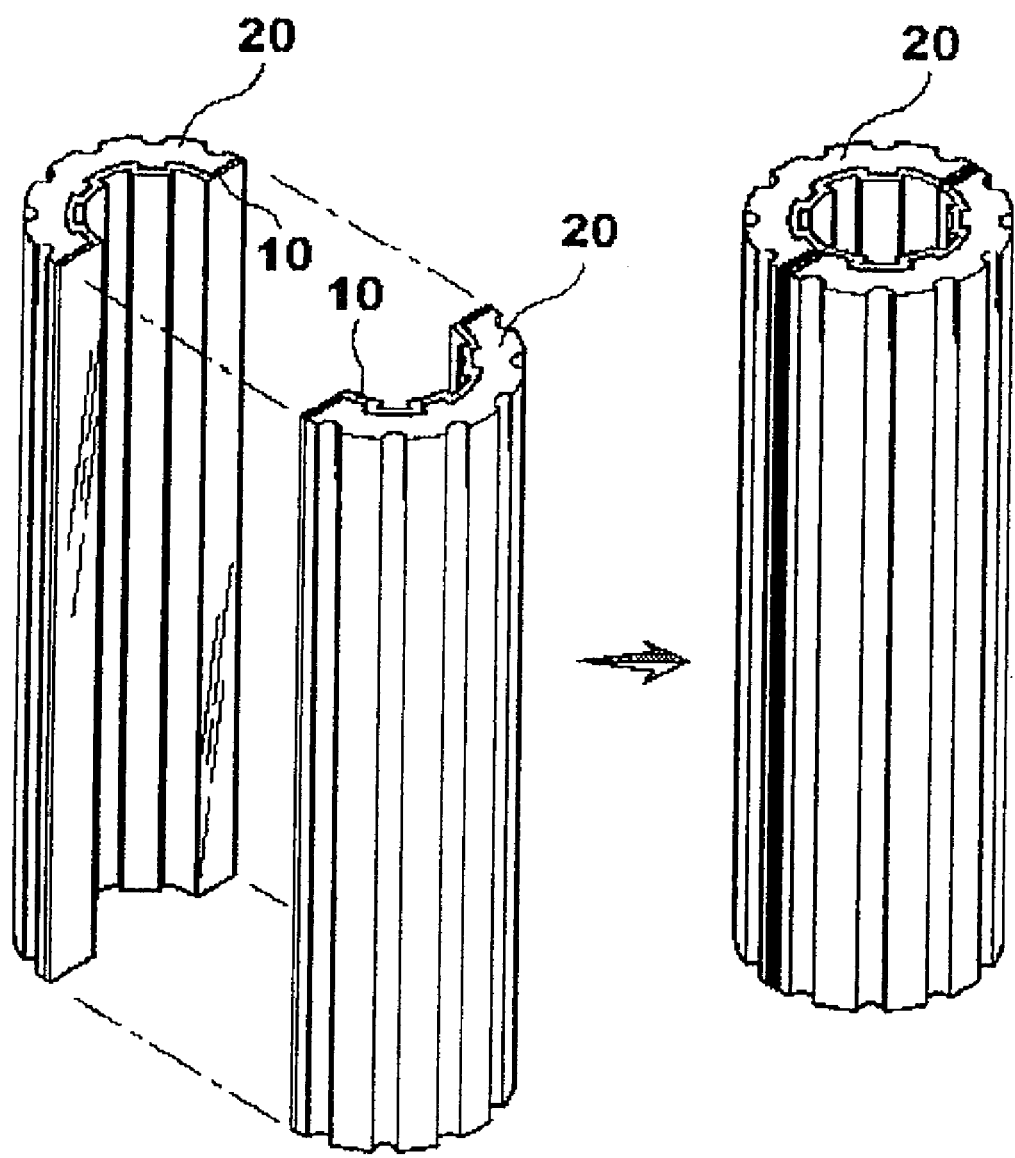
[Fig. 9]

SOLID PANEL FOR DECORATION

TECHNICAL FIELD

The present invention relates to a 3-dimensional decorative panel capable of easily embodying a wanted 3-dimensional shape by using Styrofoam having good heat insulation and workability.

BACKGROUND ART

Styrofoam has advantages of good heat insulation and easy transportation due to its light weight, but also has disadvantages of weak durability.

The weak durability means that Styrofoam can be easily processed. Also, since Styrofoam can be easily moved due to the light weight, the embossment of 3-dimensional shape such as protruding column, character, intaglio, and relieve can be easily carried out. Therefore, it is preferable that Styrofoam is processed as a 3-dimensional panel.

In order to use the embossed Styrofoam as a decorative panel, the durability should be reinforced. The durability may be obtained by attaching a metal plate having a reinforcing core onto a rear side of Styrofoam or by applying polygarde or silicon onto a surface of Styrofoam.

The 3-dimensional decorative finishing is generally achieved by using wood or attaching field stones or artificial stones onto a wall. However, there are drawbacks of increased material costs and hard machining of the material.

DISCLOSURE

Technical Problem

The present invention has been made in view of the foregoing problems, and it is an object of the present invention to provide a 3-dimensional decorative panel capable of diversifying decorative finishing materials.

Technical Solution

In order to achieve the above objects, in one aspect of the present invention, there is provided a 3-dimensional decorative panel made of a Styrofoam having light weight and good workability, the 3-dimensional decorative panel comprising: a drain groove formed on a side of the Styrofoam for draining a rainwater; and a metal plate coupled to a rear surface of the Styrofoam, the metal plate having a plurality of bent portions, and a reinforcing core being attached to the metal plate; in which a polygarde, silicon, a polygarde, a primer, and a colored layer are sequentially layered on a surface of the Styrofoam in order to enhance a durability of the Styrofoam.

ADVANTAGEOUS EFFECTS

With the above construction, the 3-dimensional decorative panel of the present invention can be manufactured in various shapes. Also, since the panel is manufactured in a factor, dust or smell is not produced on a spot. Since the panel is installed as an assembly on the spot, it can shorten the term of works.

In addition, the 3-dimensional panel can be provided with various colors so as to properly display voluminous and tactile impression of color.

BRIEF DESCRIPTION OF THE DRAWINGS

The foregoing and other objects, features and advantages of the present invention will become more apparent from the following detailed description when taken in conjunction with the accompanying drawings in which:

FIG. 1 is an exploded perspective view illustrating a 3-dimensional decorative panel according to a preferred embodiment of the present invention;

FIG. 2 is a cross-sectional view illustrating a 3-dimensional decorative panel according to an embodiment of the present invention;

FIG. 3 is a cross-sectional view illustrating a 3-dimensional decorative panel according to another embodiment of the present invention;

FIG. 4 is a perspective view illustrating a resilient sleeve for fixing a 3-dimensional decorative panel to a wall, according to an embodiment of the present invention;

FIG. 5 is a cross-sectional view illustrating a resilient sleeve for fixing a 3-dimensional decorative panel to a wall, according to an embodiment of the present invention;

FIG. 6 is a perspective view explaining a process of attaching a tile to a 3-dimensional decorative panel according to an embodiment of the present invention;

FIG. 7 is a perspective view explaining a process of attaching a tile to a 3-dimensional decorative panel according to another embodiment of the present invention;

FIG. 8 is a perspective view illustrating a 3-dimensional wall using a 3-dimensional decorative panel according to an embodiment of the present invention; and FIG. 9 is a perspective view illustrating a 3-dimensional column using a 3-dimensional decorative panel according to an embodiment of the present invention.

BEST MODE

Reference will now be made in detail to the preferred embodiment of the present invention.

FIG. 1 is an exploded perspective view illustrating a 3-dimensional decorative panel according to a preferred embodiment of the present invention.

Referring to FIG. 1, the 3-dimensional decorative panel includes a metal plate 10 having a plurality of bent portions 11. The metal plate 10 is provided with reinforcing cores 12 which are inserted into a Styrofoam 20 to support the Styrofoam 20 and thus increase the durability thereof.

The bent portions 11 are to enhance the structural performance of the metal plate 10. As a result that the metal plate 10 having the bent portions 11 is compared with a metal plate having a flat portion made of the same material and structure, through a tensile test, a compression test, and a deflection test, the bent portion 11 has the strength higher than the flat portion.

Because of the bent portion 11, it is possible to utilize the metal plate 10 having a thin thickness, thereby reducing a manufacturing cost.

The Styrofoam 20 is provided on the center portion thereof with a hole 21 through which the reinforcing core 12 is inserted, as shown in FIG. 1. Drain grooves 22 are formed on all sides of the Styrofoam 20.

The drain grooves 22 are to prevent infiltration of rainwater, in case the panel of the present invention is installed as an external wall material or roof material. If the rainwater is infiltrated, the rainwater flows down along the drain groove 22 to discharge outwardly. Therefore, the rainwater cannot infiltrate in the panel.

Although a liner is generally interposed between the assembled panels, the panel of the present invention is characterized in that the drain groove 22 having the function of the liner is formed on the panel.

FIG. 4 is a perspective view illustrating the resilient sleeve 15 for fixing the 3-dimensional decorative panel to the wall, according to an embodiment of the present invention, and FIG. 5 is a cross-sectional view illustrating the resilient sleeve 15 for fixing the 3-dimensional decorative panel to the wall.

Referring to FIGS. 4 and 5, the resilient sleeve 15 having a female threaded portion is fastened to an anchor bolt 17 fixed to the wall.

The resilient sleeve 15 has a hexagonal periphery so that it is easily fastened by a tool such as monkey spanner. The resilient sleeve 15 has a locking head 16 with opposite inclined surfaces 16a formed on a front end thereof.

The reinforcing core 12 receiving the resilient sleeve 15 is provided with a plurality of locking holes 14, in which the locking head 16 is locked, along an axial direction.

The locking head 16 of the resilient sleeve 15 is divided into two portions so that the locking head 16 inwardly contracted and then is resiliently locked in the locking hole 14 of the reinforcing core 12 when the locking head 16 is inserted into the reinforcing core 12. The formation of the inclined surface 16a on front and rear portions of the locking head 16 causes the 3-dimensional panel to be easily attached to the wall or removed from the wall.

Since the reinforcing core 12 is provided with the plurality of locking holes 14 along the axial direction, the 3-dimensional panel can be installed to the wall, irrespective of the state of the target wall, for example, an inclined wall or an irregular surface of the wall.

The Styrofoam 20 is a brand name of expanded polystyrene which is also called as EPS.

Since the Styrofoam 20 is white and light weight, and has good water resistance, good heat insulation, good acoustical insulation, good shock absorbing, and good workability, it is generally used as a construction material.

The panel of the present invention is also characterized in that after the Styrofoam 20 is carved in relief, polygarde 30 and silicon 31 are applied on the surface of the Styrofoam 20 so as to reinforce the durability of the Styrofoam 20, and then the Styrofoam 20 is rapidly cured, and in that the metal plate 10 having the plurality of bent portions 11, to which the reinforcing cores 12 are attached, is attached to the rear surface of the Styrofoam 20. The cross-sectional structure of the present invention is shown in FIG. 2.

Referring to FIG. 2, the polygarde, the silicon 31, the polygarde 30, a primer 32, and a colored layer 33 are sequentially layered on the surface of the Styrofoam 20 engaged to the metal plate 10, which is shown in an enlarged view indicated by a circle in FIG. 2.

Before the Styrofoam is cured, the Styrofoam is carved in relief to have a 3-dimensional shape. This work may be manually carried out. However, for mass production thereof, each element of an existing product and new product can be digitalized through CAD operation, and the Styrofoam is automatically carved in relief by a CNC machine to have a 3-dimensional shape.

After the machining of the Styrofoam 20 is completed, the polygarde, the silicon 31, the polygarde 30, the primer 32, and the colored layer 33 are sequentially layered on the surface of the Styrofoam 20, as described above.

The polygarde 30 is a non-foam polyurethane coating, and is applied for the rapid curing.

After the polygarde 30 is applied, the silicon 31 is sprayed on the polygarde 30. The silicon 31 is to increase the strength of the Styrofoam 20. Also, the polygarde 30 is again applied on the silicon 31 to prevent granular silicon 31 from being detached.

The primer 32 is applied on the polygarde 30. The primer 32 puts the surface of the polygarde 30 to be coarse, so as to properly display voluminous and tactile impression of color when the colored layer 33 is formed, and to prevent the colored layer 33 from being easily peeled off.

FIG. 3 is a cross-sectional view illustrating a 3-dimensional decorative panel according to another embodiment of the present invention.

In case the panel of the present invention is used as a ceiling material or wall material, the reinforcing core 12 is outwardly extended from the Styrofoam 20 so as to easily hang a lamp or wall-mounted decoration. A threaded portion 13 is formed on a free end of the reinforcing core 12, so that the lamp or wall-mounted decoration is threadedly engaged to the threaded portion.

FIGS. 6 and 7 are views explaining a process of attaching a tile 41 to the 3-dimensional decorative panel according to an embodiment of the present invention. As described above, after the Styrofoam 20 is carved in relief by the CNC machine and the surface thereof is cured, the surface may be colored in various colors. The tile 41 of diverse patterns may be attached to the outer surface of the panel of the present invention.

In order to attach the tile 41, the Styrofoam 20 is provided with a locking portion 40 for receiving the tile 41, and an adhesive is applied on the rear surface of the tile 41. With the construction, the tile 41 is fixed by the locking portion 40 and the adhesive.

FIG. 7 is a perspective view explaining a process of attaching a tile 40 to a 3-dimensional decorative panel according to another embodiment of the present invention. The Styrofoam 20 is provided with a locking pin 42 for supporting the tile 41, instead of the locking portion 40 shown in FIG. 6. The tile 41 is attached by the locking pin 42.

FIG. 8 is a perspective view illustrating a 3-dimensional wall using a 3-dimensional decorative panel according to an embodiment of the present invention, and FIG. 9 is a perspective view illustrating a 3-dimensional column using a 3-dimensional decorative panel according to an embodiment of the present invention.

Referring to FIG. 8, after the Styrofoam 20 is cut to have a 3-dimensional shape by the CNC machine, the metal plate 10 having the bent portions 11 is attached to the Styrofoam. In this instance, the reinforcing core 12 attached to the metal plate 10 has a length in proportion to the length of the 3-dimensional Styrofoam 20, in order to stably support the protruding Styrofoam 20.

Referring to FIG. 9, after the Styrofoam is formed as a column of a semicircular cross section, two Styrofoam is adhered to each other to form a hollow circular column. It may enclose an existing structure.

INDUSTRIAL APPLICABILITY

As can be seen from the foregoing, the panel of the present invention can be manufactured in various shapes. Also, since the panel is manufactured in a factor, dust or smell is not produced on a spot. Since the panel is installed as an assembly on the spot, it can shorten the term of works.

In addition, the 3-dimensional panel can be provided with various colors so as to properly display voluminous and tactile impression of color.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A 3-dimensional decorative panel made of a polystyrene foam (20) having light weight and good workability, the 3-dimensional decorative panel comprising:
 a drain groove (22) formed on a side of the polystyrene foam (20) for draining a rainwater; and
 a metal plate (10) coupled to a rear surface of the polystyrene foam (20), the metal plate having a plurality of bent portions (11), and a reinforcing core (12) being attached to the metal plate (10);
 in which a polygarde (30), silicon (31), a polygarde (30), a primer (32), and a colored layer (33) are sequentially layered on a surface of the polystyrene foam (20) in order to enhance a durability of the polystyrene foam (20), wherein the reinforcing core (12) is provided with a plurality of locking holes (14) in an axial direction, and a locking head of a resilient sleeve (15) is fixed to the locking hole (14) to install the panel to a wall, in which the locking head is divided into two parts.

2. A 3-dimensional decorative panel made of a polystyrene foam (20) having light weight and good workability, the 3-dimensional decorative panel comprising:
 a drain groove (22) formed on a side of the polystyrene foam (20) for draining a rainwater;
 a locking portion (40) formed on a surface of the polystyrene foam (20) for locking a tile (41); and
 a metal plate (10) coupled to a rear surface of the polystyrene foam (20), the metal plate having a plurality of bent portions (11), and a reinforcing core (12) being attached to the metal plate (10);
 in which a polygarde (30), silicon (31), a polygarde (30), a primer (32), and a colored layer (33) are sequentially layered on a surface of the polystyrene foam (20) in order to enhance a durability of the polystyrene foam (20), wherein the reinforcing core (12) is provided with a plurality of locking holes (14) in an axial direction, and a locking head of a resilient sleeve (15) is fixed to the locking hole (14) to install the panel to a wall, in which the locking head is divided into two parts.

* * * * *